Oct. 29, 1957     W. L. BENSON     2,811,173
METAL BELLOWS
Filed May 11, 1954
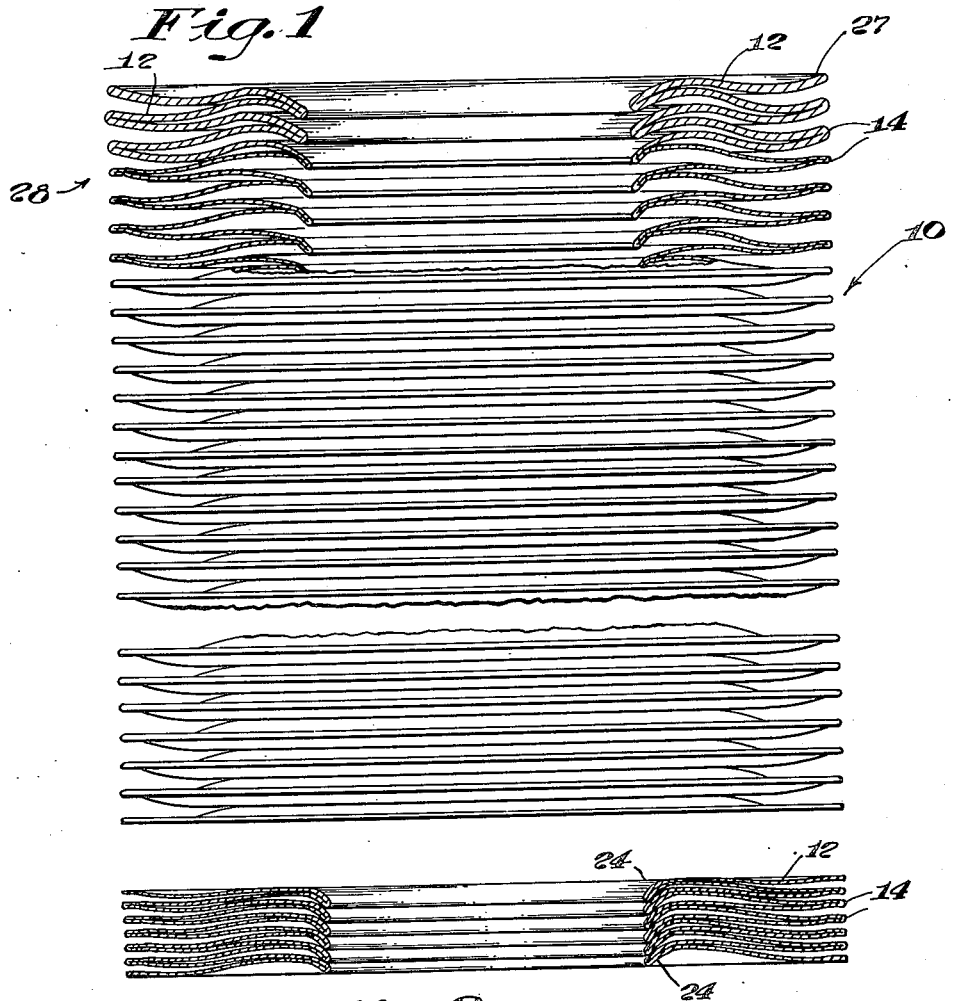
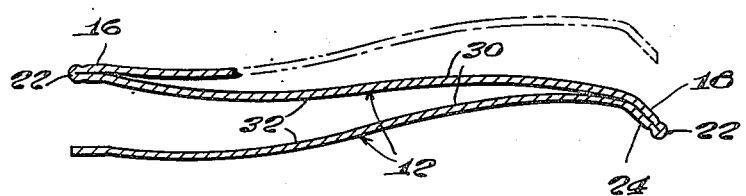
INVENTOR.
Walter L. Benson
BY J. Stanley Churchill.
ATTORNEY United States Patent Office 2,811,173
Patented Oct. 29, 1957

2,811,173

METAL BELLOWS

Walter L. Benson, Needham, Mass., assignor to Process Engineering Inc., Somerville, Mass., a corporation of Massachusetts Application May 11, 1954, Serial No. 428,994

3 Claims. (Cl. 137—796)

This invention relates to a metal bellows.

The invention has for a principal object to provide a novel and improved metal bellows which is capable of efficient use in producing high gaseous pressures.

A further object of the invention is to provide a bellows which is capable of withstanding the stress and strain resulting from the innumerable expansions and contractions of rigorous use and which will remain airtight for long periods of time.

A still further object is to provide a bellows which will not "squirm" or deviate substantially from the line of direction of the compressive force which may be exerted on the bellows when it is compressed to produce a high gaseous pressure therein. Therefore, any additional strain which would result from such "squirming" is substantially eliminated.

With these general objects in view and such others as may hereinafter appear the invention consists in the metal bellows hereinafter described and particularly defined in the claims at the end of this specification.

In general the present invention contemplates a novel construction of metal bellows formed of a series of annular metal plates or disks. The annular metal plates at each end of the complete bellows are welded at their inner edges only to the next adjacent annular plates forming the first and last convolutions of bellows. The component plates of each convolution are welded together at their periphery and the inner edge portions of all of the plates extended angularly in the same direction to form restraining portions which nest when the bellows is compressed. The angularly extended inner edge portions of the lower plate of one convolution are welded to the upper plate of a succeeding convolution. Each plate is formed with a shallow reverse curvature to form two oppositely but symmetrically curved half sections.

In the drawings illustrating the preferred embodiment of the invention:

Fig. 1 is a side elevation partly in cross section illustrating the bellows in its extended position;

Fig. 2 is a cross section illustrative of a portion of the bellows in its compressed position; and Fig. 3 is a section showing a plurality of the annular plates in their connected bellows forming relation.

Referring now to the drawings, in general the present novel metal bellows 10 comprises a plurality of concentric annular metal plates 12 of relatively thin flexible sheet metal which are assembled to form a series of convolutions indicated generally at 14. In practice successive annular plates 12 may be connected together alternately at their outer and inner peripheries 16, 18 preferably by welding as indicated at 22. In operation the assembled bellows 10 is adapted to be secured at one end to a fixed member, not shown, and at its other end to a movable member, also not shown, movement of the movable member effecting compression or expansion of the bellows and creating internal gaseous pressure or releasing the pressure created by such movement.

One of the principal difficulties involved in the operation of prior metal bellows is that when internal pressure is built up within the bellows the individual plates forming the bellows have a tendency to buckle or "tin-can," as the buckling is sometimes called. Such buckling exerts undue strain upon the welded connections between the adjacent plates forming the bellows, and thus the life of the bellows is greatly reduced. In accordance with one feature of the present invention the annular plates 12 may be preshaped or die set so as to form a radially extended undulating surface, herein shown as comprising a shallow convex shaped portion 30 extending from the inner periphery of the plate to a radial line midway between the inner and outer peripheries and a shallow concave shaped portion 32 coextensive with the convex portion and extending from the said radial line to the outer periphery of the plate, thus forming in effect a reverse curvature comprising two oppositely but symmetrically curved half sections. As a result of this structure it was found that the tendency of the plates to buckle when an internal pressure is built up in the bellows is substantially eliminated so that a minimum strain is placed upon the welded connections at the inner and outer peripheries of the annular plates. In practice the reverse curvature of the plates lends rigidity to resist buckling under pressure while maintaining sufficient flexibility to permit the plates to bend when the bellows is expanded or retracted.

In the preferred form of the present invention successive annular plates 12 are welded together alternately at their inner and outer ends 18, 16 preferably by arc welding the material along the marginal edges of the plates. In one form of the invention the plates may be made of sheet metal .018 to .025 inch thick, and the welds 22 are preferably .037 inch in length and of a thickness substantially the same as the combined thickness of the plates welded together. In this manner the plates 12 are securely joined using the material comprising the plates themselves as a bonding material. In prior art metal bellows the weakest portion of said bellows has been proven to be at the point of connection between the individual plates comprising the bellows. The present weld 22 together with the other novel structural features of the present bellows results in a bellows in which failures are reduced to a minimum.

Another difficulty experienced in the operation of prior metal bellows of substantial length is that they have a tendency to "squirm" or deviate substantially in a lateral direction from the longitudinal line of direction of the compressive force exerted thereon when the bellows is compressed. In accordance with another feature of the present invention in order to reduce such "squirming" to a minimum, and thus eliminate the lateral stresses occasioned by such "squirming," the inner periphery of each annular plate 12 may be bent downwardly to a position substantially 45° from the horizontal plane of the annular plates 12 to form a depending conical rim 24 adapted to be welded to a corresponding rim of an adjacent plate, thus providing each convolution with a depending conical portion adapted to nest in the conical portion of an adjacent convolution when the bellows is compressed, as illustrated in Fig. 2, to thereby prevent displacement of the convolutions of the bellows laterally with respect to the longitudinal axis of the bellows. In operation when the internal pressure within the bellows is increased due to increased compression of the bellows it will be seen that the conical portions 24 become more firmly nested and locked together, thus increasing their resistance to the tendency of the bellows to "squirm" laterally as the internal pressure increases. It will be understood that the depending conical nesting portions may be bent at other angular positions if desired.

In the use of the present bellows one end 27 of the bellows may be secured in sealed relation to and suspended from a fixed member, and the other end may be secured in sealed relation to a movable member, and the bellows may be provided with suitable intake and outlet valves, not shown, for controlling the internal pressure created within or released from the bellows. In order to compensate for the weight of the bellows when suspended and to maintain the pleats 14 in uniformly spaced relation to each other, a predetermined number of the annular plates 12 connected to form the upper end of the bellows 10 may be formed from a metal of a heavier gauge, as indicated at 28. I have found that slightly heavier gauge metal plates have sufficient rigidity and strength to support the weight of the underlying plates 12, and therefore, substantially prevent the bellows from being stretched out of shape and undue strain placed upon the welded joints 22 causing them to crack, separate and consequently the bellows to be rendered inoperative.

Within the province of the present invention the present metal bellows may be of any desired diameter and may be accordingly more or less expansible in proportion to the diameter size of the annular plates 12 and the number of pleats 14 formed therefrom.

It will be observed from the foregoing description that the present bellows embodies several novel features in its construction which render the bellows capable of long, hard use without appreciable loss of operating efficiency. The bellows is capable of producing relatively high gaseous pressures, and for this purpose may be suspended vertically or horizontally in use.

While the preferred embodiment of the invention has been herein illustrated and described, it will be understood that the invention may be embodied in other forms within the scope of the following claims.

Having thus described the invention, what is claimed is:

1. A bellows for use in the production of high gaseous pressure comprising a plurality of concentric annular metal plates positioned one above the other and connected together alternately at their inner and outer peripheries to form a series of bellows convolutions, the inner peripheries of the convolutions each being provided with a conical rim portion extended downwardly for a substantial distance below the periphery of the plate forming the upper member of the convolution whereby when the bellows is compressed the downwardly extended rim portion of each convolution extends below the upper plate of the next lower convolution and nests therein, thereby preventing displacement of said convolutions with respect to the longitudinal axis of the bellows.

2. A bellows as defined in claim 1 wherein said plates are reversely curved in a direction radially outward, and said inner and outer peripheries are connected together by welding.

3. A bellows for use in the production of high gaseous pressure comprising a plurality of concentric annular metal plates positioned one above the other and connected together alternately at the inner and outer peripheries to form a series of bellows convolutions, the inner periphery of each convolution being provided with a solid conical rim portion extended downwardly at an angle of about 45° with relation to the horizontal plane of the plate and extended below the periphery of the plate forming the upper member of the convolution whereby when the bellows is compressed the downwardly extended rim portion of each convolution extends below the upper plate of the next lower convolution and nests therein, thereby preventing displacement of said convolutions with respect to the longitudinal axis of the bellows.

References Cited in the file of this patent
UNITED STATES PATENTS

| | | |
|---|---|---|
| 966,790 | Bristol | Aug. 9, 1910 |
| 1,195,133 | Dalen | Aug. 15, 1916 |
| 2,303,642 | Hoy | Dec. 1, 1942 |
| 2,534,123 | Hasselhorn | Dec. 12, 1950 |